United States Patent
Headley

(10) Patent No.: US 8,209,994 B1
(45) Date of Patent: Jul. 3, 2012

(54) WATER CONDENSING SYSTEM

(76) Inventor: Gary B. Headley, Lakeland, FL (US)

( * ) Notice: Subject to any disclaimer, the term of this patent is extended or adjusted under 35 U.S.C. 154(b) by 340 days.

(21) Appl. No.: 12/705,883

(22) Filed: Feb. 15, 2010

Related U.S. Application Data

(63) Continuation-in-part of application No. 11/537,969, filed on Oct. 2, 2006, now abandoned.

(51) Int. Cl.
*F25D 21/14* (2006.01)
(52) U.S. Cl. .................................. 62/285; 62/235.1
(58) Field of Classification Search .................. 62/235.1, 62/264, 285
See application file for complete search history.

(56) References Cited

U.S. PATENT DOCUMENTS

| | | | |
|---|---|---|---|
| 2,084,392 A * | 6/1937 | Frank et al. ................ | 62/408 |
| 4,255,937 A | 3/1981 | Ehrlich | |
| 4,861,940 A | 8/1989 | Carpenter, Jr. | |
| 5,724,824 A * | 3/1998 | Parsons ..................... | 62/171 |
| 6,487,867 B1 * | 12/2002 | Herren ..................... | 62/150 |
| 6,499,309 B1 | 12/2002 | Yeh | |
| 6,755,037 B2 | 6/2004 | Engel et al. | |
| D508,735 S | 8/2005 | Klein | |

* cited by examiner

*Primary Examiner* — Melvin Jones

(57) ABSTRACT

A community-scale water condensing system which reclaims and stores double-filtered potable water from the air utilizing at least one condenser unit including polyethylene pipe suspended over a collection tank and shaken by a self-contained power source upon activation of a moisture sensor to release water into the collection tank. Water flows from the collection tank into a storage tank through a ball valve and a water storage filter. At least one dispensing unit operationally communicates with the storage tank, each dispensing unit including at least one feeder line with an output valve that can be accessed by an individual through a water tap or other outlet mechanism. A water usage filter disposed between each output valve and each water tap removes debris from the water prior to dispensing the water from the water tap. An auxiliary dispensing unit selectively dispenses additional water during maintenance or shutdown of the other dispensing units.

4 Claims, 2 Drawing Sheets

WATER CONDENSING SYSTEM

CROSS-REFERENCE TO RELATED APPLICATIONS

Benefit of my U.S. Nonprovisional application Ser. No. 11/537,969 filed Oct. 2, 2006.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved an external water condensing system that reclaims potable water from an ambient air source.

DESCRIPTION OF THE PRIOR ART

Various water condensation collection devices have been previously developed. However, what is needed is a water condensing system which reclaims and stores filtered potable water from the air utilizing polyethylene pipe as recovery coils within a scalable structure, the pipe suspended over a collection plan and shaken by a self-contained power source upon the detection of moisture by a moisture sensor of water in order to release drops of water to fall into the collection pan without physical contact with the device or the water.

SUMMARY OF THE INVENTION

The present invention concerns that of a new and improved a community-scaled water condensing system which reclaims and stores filtered potable water from the air utilizing polyethylene pipe for recovery coils, which is suspended over a collection plan and shaken by a self-contained power source upon the detection of moisture by a moisture sensor of water to release drops of water to fall into the collection pan without physical contact with the device or the water.

The theory behind the present water condensing system is that air is filled with water and that condensation forms on any surface that is below the ambient temperature of the air. If the surface temperature of an object is controlled with a control device to assume a temperature below the ambient air temperature, condensation will form on the object surface and thus, water may be reclaimed from the air using the control device.

The water condensing system is a community-scale machine designed for use to condense potable water from the air and includes one or more condenser units. Each of the condenser units empties into a large, central water storage tank, which subsequently has at least one output valve that can be accessed by an individual through a water tap or other outlet mechanism. Thus, reclaimed water is stored for potable use by utilizing the present system. A water usage filter disposed between the water output valve and the water tap is incorporated into the system to remove any airborne debris from the water prior to dispensing the water from the water tap.

The present pipe is formed of polyethylene which is light weight, has cooling duration properties, and is easily repaired. The present water condensing system may be utilized to address the water needs of disaster areas and in remote areas which do not have access to utilities, such as water and electricity. The lightweight property of the polyethylene pipe accommodates easy and less costly transport to disaster-stricken and remote sites.

Test results by the inventor show that condensation forming on test coils was 1 ounce per 100 square inches of recovery coil surface area within 60 minutes at an ambient air temperature of 80 degrees Fahrenheit with 80% humidity. Water in the amount of 14 ounces is reclaimed utilizing 100 feet of ⅜-inch diameter recovery coils which provides 1413 square inches of surface area at the same ambient 80-degree Fahrenheit air temperature and 80% humidity. Using 100 fee of ½-inch diameter recovery coils at the same ambient 80-degree Fahrenheit air temperature and 80% humidity results in the formation of 18.5 ounces of reclaimed water. In addition, the test results showed that as the humidity level increases, the reclamation output increases. With the scalable design of the system, the amount of the reclaimed water will almost double when the size of the setup doubles. Upon reaching maximum reclamation utilizing a single system, additional systems may be utilized to increase potable water output.

Additionally, test results utilizing the present water condensing system show that the highest yield of reclaimed water occurs between sunrise and 12 pm. As the temperature increases, increased water is released into the air from all surfaces that are below dew point. Further, a low yield of reclaimed water occurs between 12 pm to 4 pm because more energy is required to maintain the dew point for less humidity. A high yield of reclaimed water occurs between 4 pm and dusk as the ambient air temperature decreases and the humidity increases. A low yield occurs after dusk because the temperature of the recovery coils is the same as other surfaces in equaling the dew point. A low yield occurs at night when the temperature is lower and more energy is required to raise the recovery coil surface temperature to attain the dew point.

There has thus been outlined, rather broadly, the more important features of a water condensing system that the detailed description thereof that follows may be better understood and in order that the present contribution to the art may be better appreciated. There are, of course, additional features of the water condensing system that will be described hereinafter and which will form the subject matter of the claims appended hereto.

In this respect, before explaining at least one embodiment of the water condensing system in detail, it is to be understood that the water condensing system is not limited in its application to the details of construction and to the arrangements of the components set forth in the following description or illustrated in the drawings. The water condensing system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present water condensing system. It is important, therefore, that the claims be regarded as including such equivalent constructions insofar as they do not depart from the spirit and scope of the present invention.

It is therefore an object of the present invention to provide a water condensing system which has all of the advantages of the prior art and none of the disadvantages.

It is another object of the present invention to provide a water condensing system which may be easily and efficiently manufactured and marketed.

It is another object of the present invention to provide a water condensing system which is of durable and reliable construction.

It is yet another object of the present invention to provide a water condensing system which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
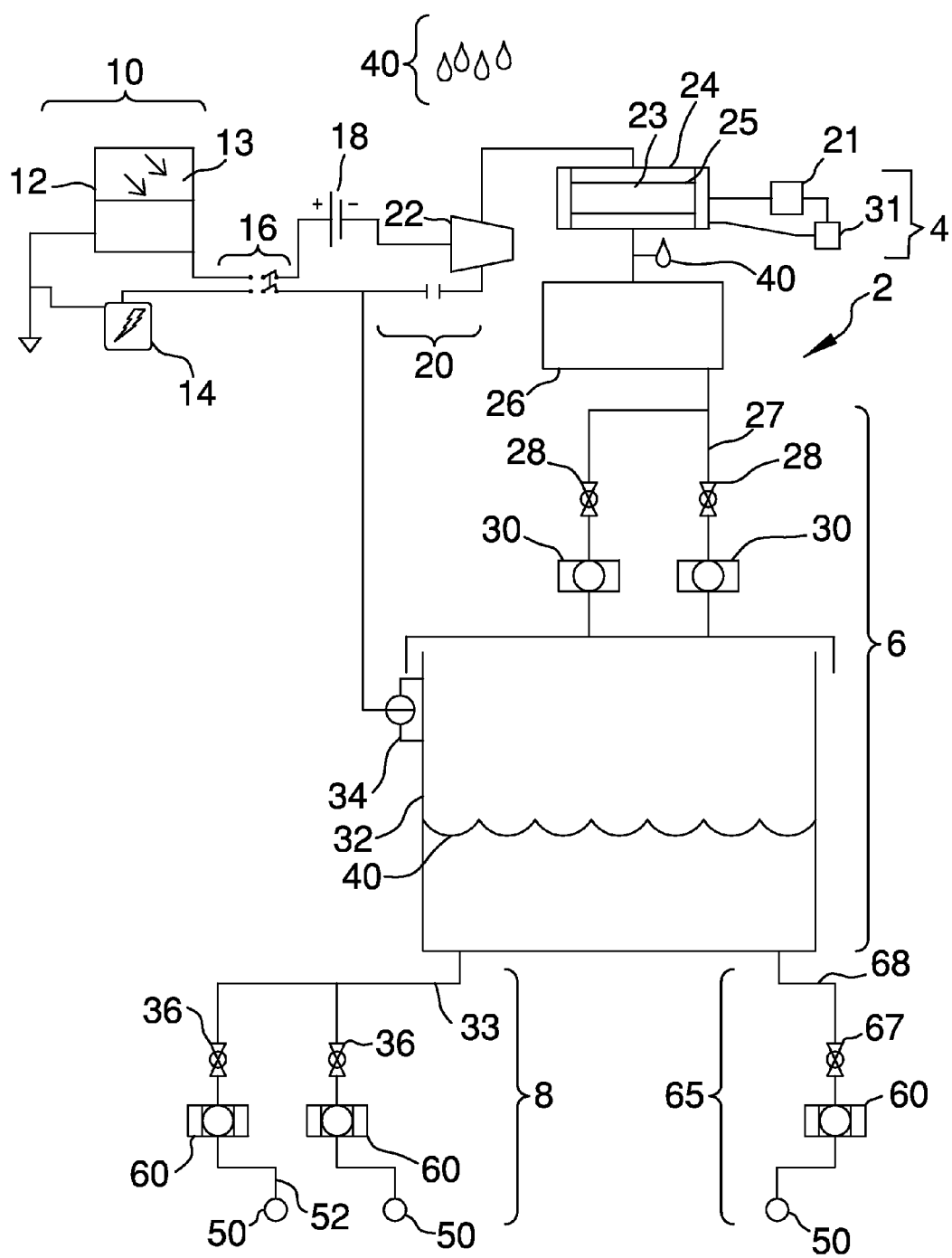
FIG. 1 is a schematic diagram of a single stage water condensing system.
Figure 2:
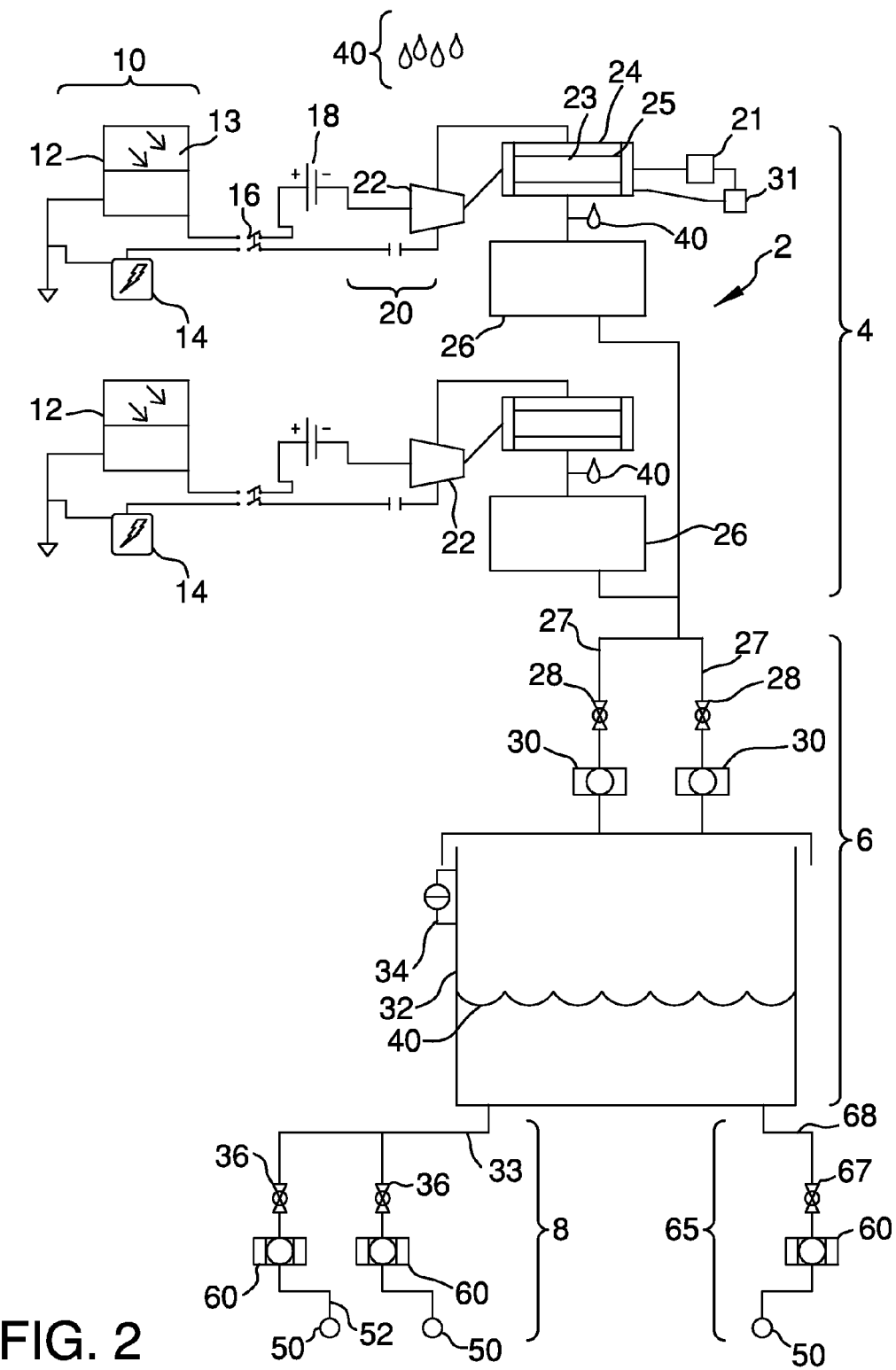
FIG. 2 is a schematic diagram of a scalable design.

With reference now to the drawings, and in particular to FIGS. 1 and 2 thereof, a new and improved water condensing system embodying the principles and concepts of the present invention and generally designated by the reference numeral 2 will be described.

As best illustrated in FIGS. 1 and 2, the water condensing system 2 comprises three portions that are interconnected with one another. A collection unit 4 is connected to a storage unit 6, which subsequently is connected to a dispensing unit 8. All three units work in conjunction with one another to collect water from the air, store the water, and then dispense it only when needed by an individual.

Collection unit 4 comprises power means 10 for providing power to the collection unit 4 so it can properly function and collect water 40 from the air. Power means 10 can be a wide variety of power-generating sources but preferably is a solar array 12 or a generator 14. The solar array 12 may include a plurality of items 13 that can generate power from the sun, such as a number of solar cells. In the alternative, the generator 14 can be used to provide power to the collection unit 4. A switch 16 is present which allows an individual to choose which of the two power means 10 can be used to provide power to the collection unit 4.

The solar array 12 and the generator 14 are both connected, via the switch 16, to a storage battery 18 that is rechargeable. The battery 18 is directly connected to a coolant compressor 22, which itself is directly connected to the condenser unit 24. A volume of condenser liquid 23 is located within the condenser unit 24 by pipe 25 and is cooled by the coolant compressor 22 an ongoing, continual basis. The pipe 25 is formed of polyethylene. Polyethylene is light weight, has good cooling duration properties, and is easily transported and repaired. Therefore, the use of polyethylene pipe is necessary for the function of the device.

The coolant compressor 22 is connected to the switch 16 via a thermal switch 20. This connection allows the thermal switch 20 to "trip" if the condenser unit 24 becomes too hot, and thus, prevent the water condensing system 2 from being electrically burned out.

The condenser unit 24, on an ongoing basis, removes water 40 from the air and condenses the water 40 to liquid form, depositing the water 40 in the water collection tank 26 in the process. Upon the detection of water 40 by a moisture sensor 21 in operational communication with the condenser unit 24, a self-contained power source 31 shakes the polyethylene pipe 25 suspended over a collection tank 26 to release water into the collection tank 26. Water 40 contained in the water collection tank 26 then drops into the storage unit 6.

The storage comprises at least one water storage tank 32, which is the primary storage tank for water in the water condensing system 2. Before entering the water storage tank, it must travel through at least one outflow line 27, with each outflow line 27 having a ball valve 28 and a water storage filter 30 to ensure that the water is properly filtered. The water storage tank 32 has a level meter 34 associated with it to properly measure, on an ongoing and continual basis, the level of water 40 within the water storage tank 32.

Below the storage unit 6 is the dispensing unit 8. The dispensing unit 8 comprises at least one water output valve 36 that is attached to the water storage tank 32 via a feeder line 33. The output valve 36 is preferably a handle. The dispensing unit 8 also comprises at least one water usage valve 38, with one water usage valve 38 being attached to each output valve 36. Each of the water usage valves 38 are capable of measuring the amount of water that flows through its respective water output valve 36. A water tap 50 is operationally disposed at the terminus 52 of each feeder line 33. Between each output valve 36 and the water tap 50 is a water usage filter 60. The water usage filter 60 is incorporated into the system to remove any airborne debris from the water 40 prior to dispensing of the water 40 from the water tap 50 thereby promoting debris-free potable water from the water tap 50. An auxiliary dispensing unit 65 having a secondary feeder line 68 is in operational communication with the water storage tank 32. The auxiliary dispensing unit 65 is provided to selectively dispense additional water 40 as desired and to dispense water 40 during maintenance or periods of shutdown of the other dispensing units 8. The auxiliary dispensing unit 65 further includes an auxiliary output valve 67 disposed along the secondary feeder line 68 and a secondary water usage filter 60 between the auxiliary output valve 67 and the tap 50. The secondary water usage filter 60 removes debris from the water 40 prior to dispensing of the water 40 from the water tap 50 to promote debris-free potable water 40 from the water tap 50.

A wide variety of embodiments can exist with the present system 2. Generally, more than one collection unit 4 can be associated with the water condensing system 2, which is the case with the water condensing system 2 shown in FIG. 2. Upon reaching maximum reclamation utilizing a single system, additional systems may be utilized to increase potable water output. With the scalable design of the system shown in FIG. 2, the amount of the reclaimed water 40 will almost double when the size of the setup doubles. This helps to speed up the rate of collection of water 40 from the air when in use. Furthermore, both FIGS. 1 and 2 show a plurality of lines traveling from the water collection tank 26 to the water storage tank 32 and also show a plurality of feeder lines 33 and associated components that are exiting the water storage tank 32, which clearly allows more than one individual to receive water 40 from the water storage tank 32 at the same time.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A water condensing system comprising:
    a portable collection unit comprising:
        a coolant compressor,
        a solar array comprising a plurality of solar cells, the solar array in attached to the collection unit, the solar array in selectively, alternatively operational communication with the battery,
        a rechargeable battery charged by the solar array, the rechargeable battery in selectively, alternatively operational communication the coolant compressor,
        a backup generator in operational communication with the collection unit, the backup generator selectively, alternatively providing power to the battery
        a switch in operational communication with the backup generator and the solar array, the switch selectively, alternatively activating the backup generator and the solar array,
        a condenser unit in operational communication with the coolant compressor,
        a volume of coolant located within the coolant compressor and the condenser unit,
        a thermal switch in operational communication with the coolant compressor, wherein the thermal switch controls the operation of the condenser unit, further wherein the thermal switch deactivates operation of the coolant compressor upon detection of a pre-determined temperature of the condenser unit temperature,
        a length of polyethylene pipe disposed within the condenser unit, wherein the pipe is cooled by the coolant compressor,
        wherein an amount of water condenses on the polyethylene pipe,
        a moisture sensor in operational communication with the condenser unit,
        a self-contained power source in operational communication with the moisture sensor and with the condenser unit, wherein the self-contained power source shakes the polyethylene pipe disposed within the condenser unit upon the detection of water by the moisture sensor,
        a water collection tank receives and collects the water shaken from the polyethylene pipe,
    a storage unit in operational communication with the collection unit, the storage unit comprising:
        a water storage tank removably receiving water from the water collection tank storing the water,
        at least one outflow line attached to the water collection tank, the outflow line also being connected to the water storage tank,
        at least one ball valve, where one ball valve is located on each outflow line,
        a water storage filter disposed along each outflow line between each ball valve and the water storage tank,
        a level meter in operational communication with the water storage tank, the level meter monitoring the level of water within the water storage tank,
        a level meter attached to the water storage tank, wherein the level meter is in selective, alternative operational communication with the solar array and the backup generator,
    a dispensing unit in operational communication with the storage unit comprising:
        at least one feeder line attached to the water storage tank,
        a water output valve in operational communication with each feeder line,
        a usage valve in operational communication with each water output valve, wherein one water usage valve is attached to each feeder line,
        a water tap operationally disposed at a terminus of each feeder line.

2. A water condensing system according to claim 1 further comprising:
    a water usage filter operationally disposed between each water output valve and each water tap, wherein the water usage filter removes debris from the water prior to dispensing of the water from the water tap.

3. A water condensing system according to claim 2 further comprising:
    an auxiliary dispensing unit in operational communication with the water storage tank, the auxiliary dispensing unit comprising:
        a secondary feeder line;
        an auxiliary output valve disposed along the secondary feeder line;
        a secondary water usage filter disposed between the auxiliary output valve and the water tap, wherein the secondary water usage filter removes debris from the water prior to dispensing of the water from the water tap,
    wherein the auxiliary dispensing unit selectively dispenses water in addition to water dispensed by the dispensing units.

4. A water condensing system according to claim 3 wherein each water output valve further comprises a handle.

* * * * *